(12) United States Patent
Cheppe et al.

(10) Patent No.: US 6,343,495 B1
(45) Date of Patent: Feb. 5, 2002

(54) APPARATUS FOR SURFACE TREATMENT BY IMPACT

(75) Inventors: Patrick Cheppe, Basse Goulaine; Jean-Michel Duchazeaubeneix, Les Sorinieres, both of (FR)

(73) Assignee: Sonats-Societe des Nouvelles Applications des Techniques de Surfaces, Reze (FR)

( * ) Notice: Subject to any disclaimer, the term of this patent is extended or adjusted under 35 U.S.C. 154(b) by 0 days.

(21) Appl. No.: 09/533,272

(22) Filed: Mar. 20, 2000

(30) Foreign Application Priority Data

Mar. 23, 1999 (FR) .............................. 99 03592

(51) Int. Cl.$^7$ .............................. B24C 1/00; B21D 1/02
(52) U.S. Cl. .............................. 72/53; 72/710
(58) Field of Search ...................... 72/53, 710

(56) References Cited

U.S. PATENT DOCUMENTS

| 3,451,490 A | * | 6/1969 | Troike | ............................ | 72/53 |
|---|---|---|---|---|---|
| 3,937,055 A | | 2/1976 | Caruso et al. | | |
| 4,481,802 A | | 11/1984 | Harman et al. | | |
| 4,641,510 A | | 2/1987 | Mitsching et al. | | |
| 4,974,434 A | * | 12/1990 | Reccius et al. | ................ | 72/53 |
| 5,509,286 A | * | 4/1996 | Coulon | ........................ | 72/53 |
| 5,829,116 A | * | 11/1998 | Vilon | ........................... | 72/53 |

FOREIGN PATENT DOCUMENTS

| CH | 290394 | * | 8/1953 | ................... | 72/53 |
|---|---|---|---|---|---|
| DE | 195 43 019 A1 | | 5/1997 | | |
| EP | 0 699 775 A1 | | 3/1996 | | |
| FR | 2 689 431 A1 | | 10/1993 | | |
| SU | 1235932 | * | 6/1986 | ................... | 72/53 |

* cited by examiner

Primary Examiner—David Jones
(74) Attorney, Agent, or Firm—Oliff & Berridge, PLC

(57) ABSTRACT

The invention relates to apparatus for surface treatment by impact, the apparatus comprising a vibrating surface and at least one projectile suitable for being projected towards the surface to be treated by said vibrating surface. The apparatus includes retaining means for keeping each projectile captive in the apparatus.

51 Claims, 6 Drawing Sheets

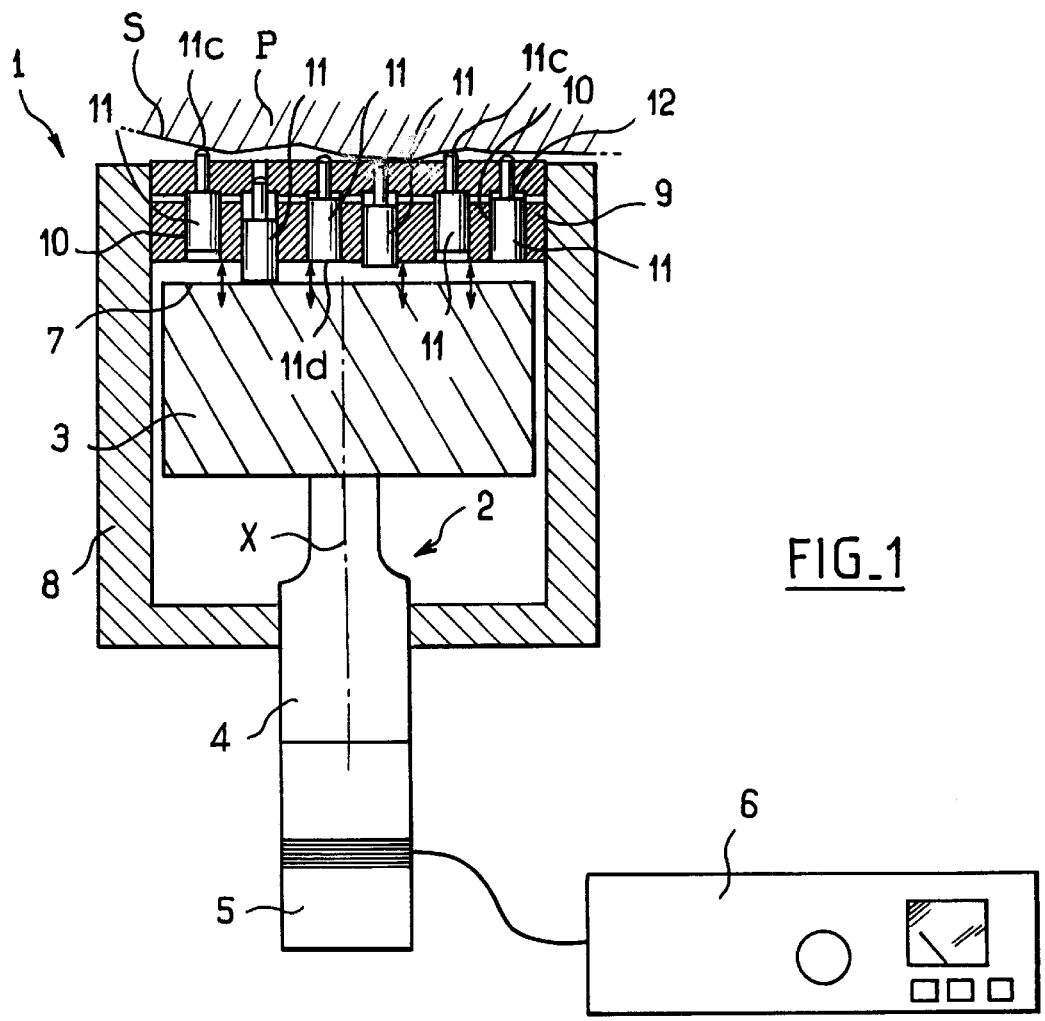
FIG_1
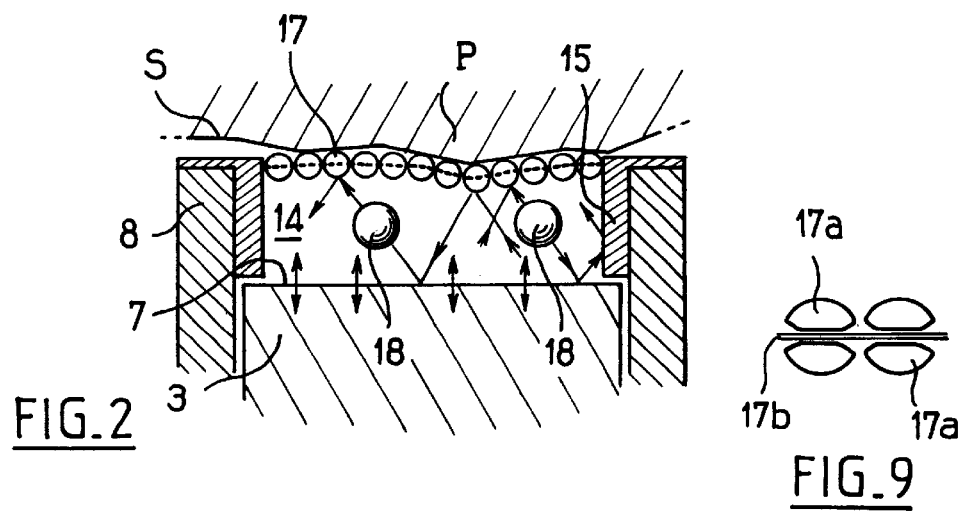
FIG_2
FIG_9

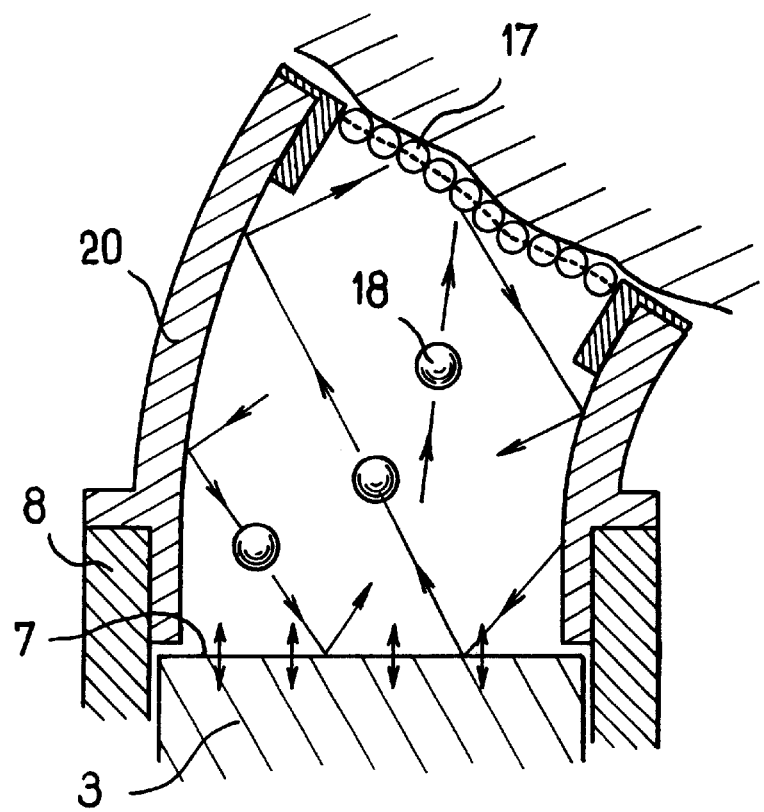
FIG_3
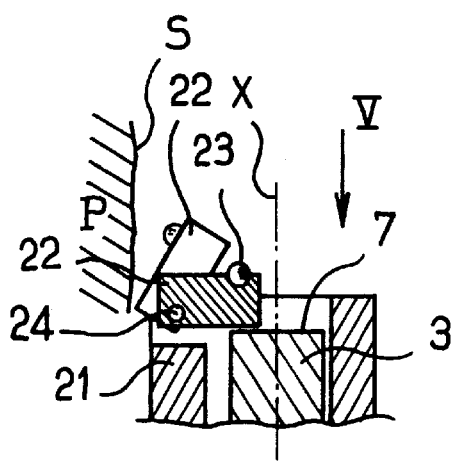
FIG_4
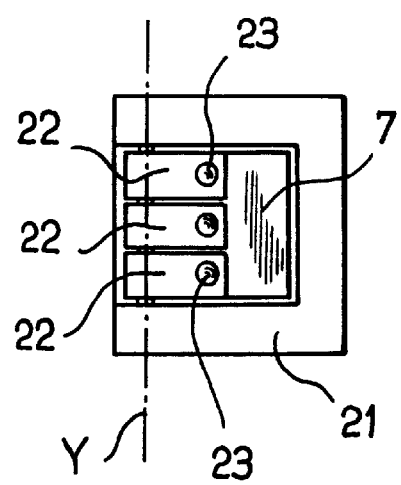
FIG_5

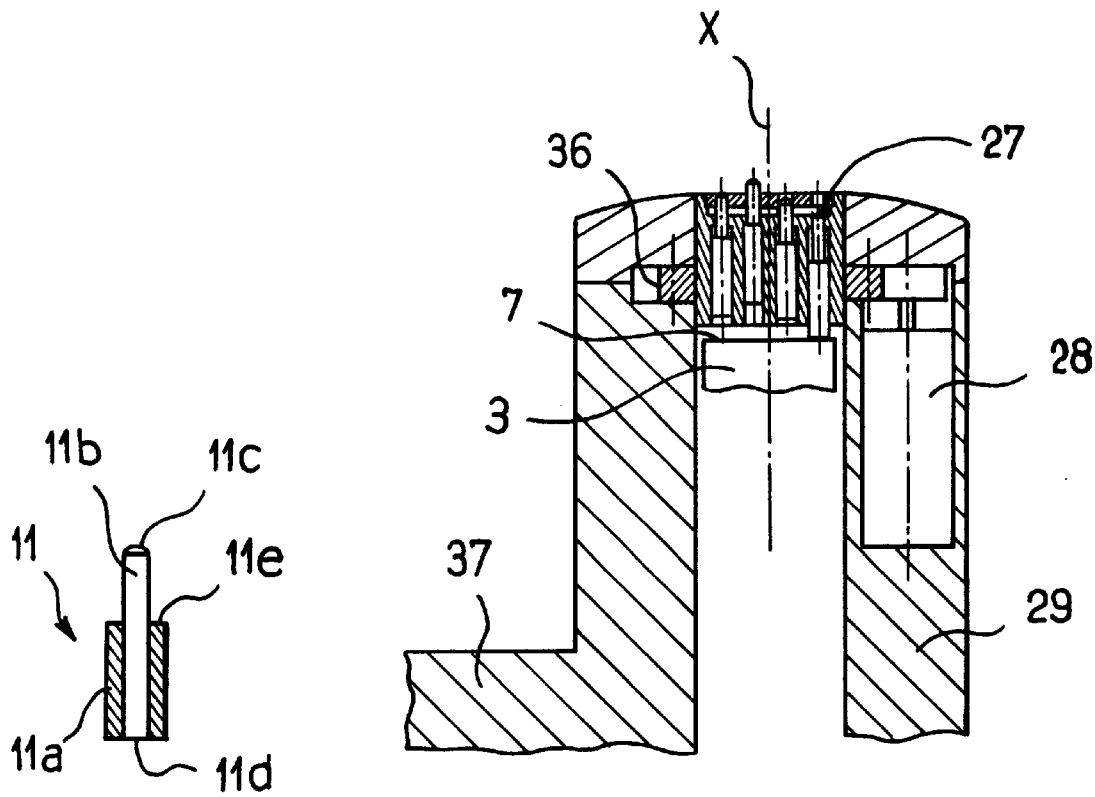
FIG_8
FIG_6
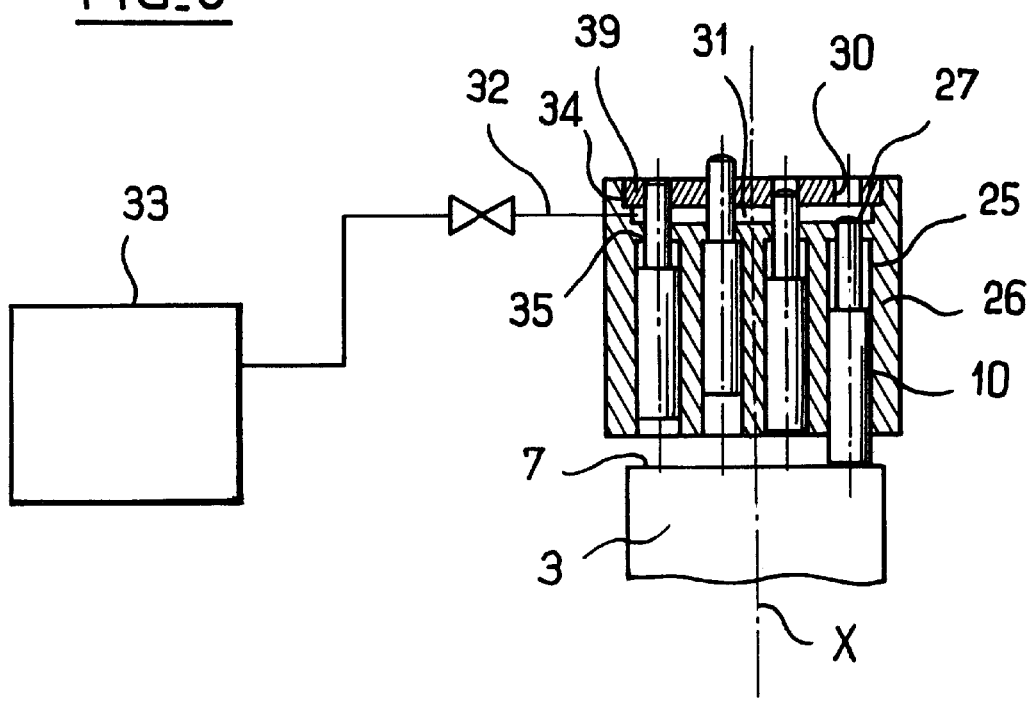
FIG_7

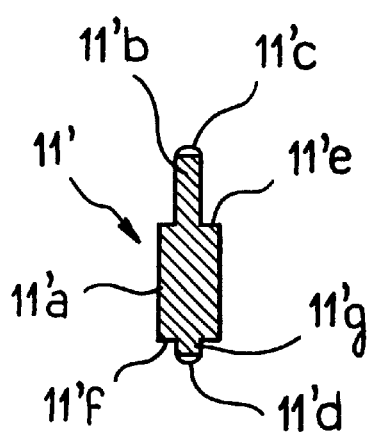
FIG_12
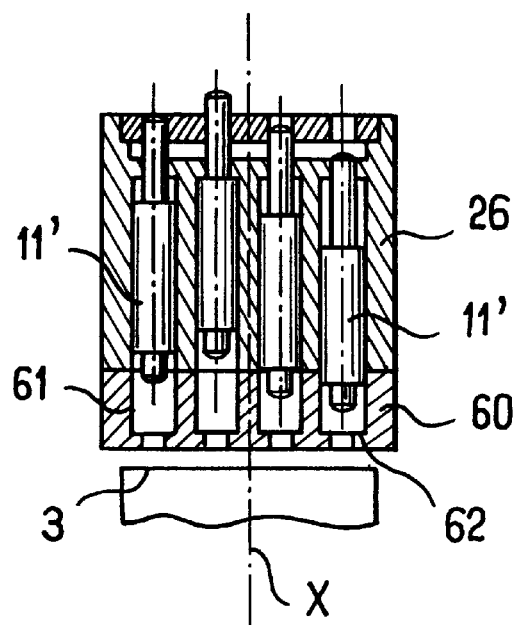
FIG_13
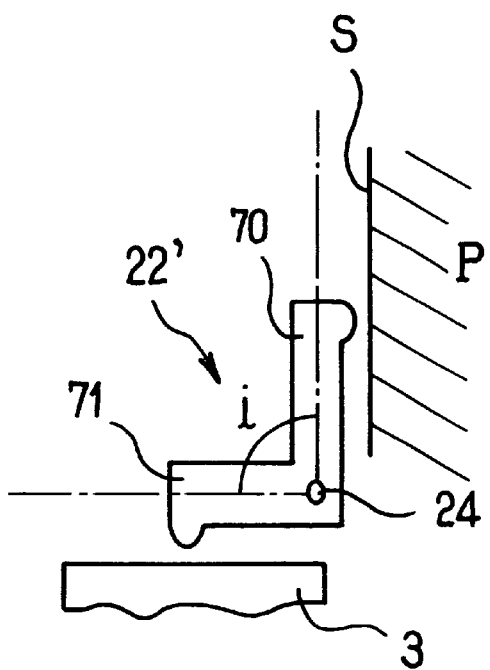
FIG_14

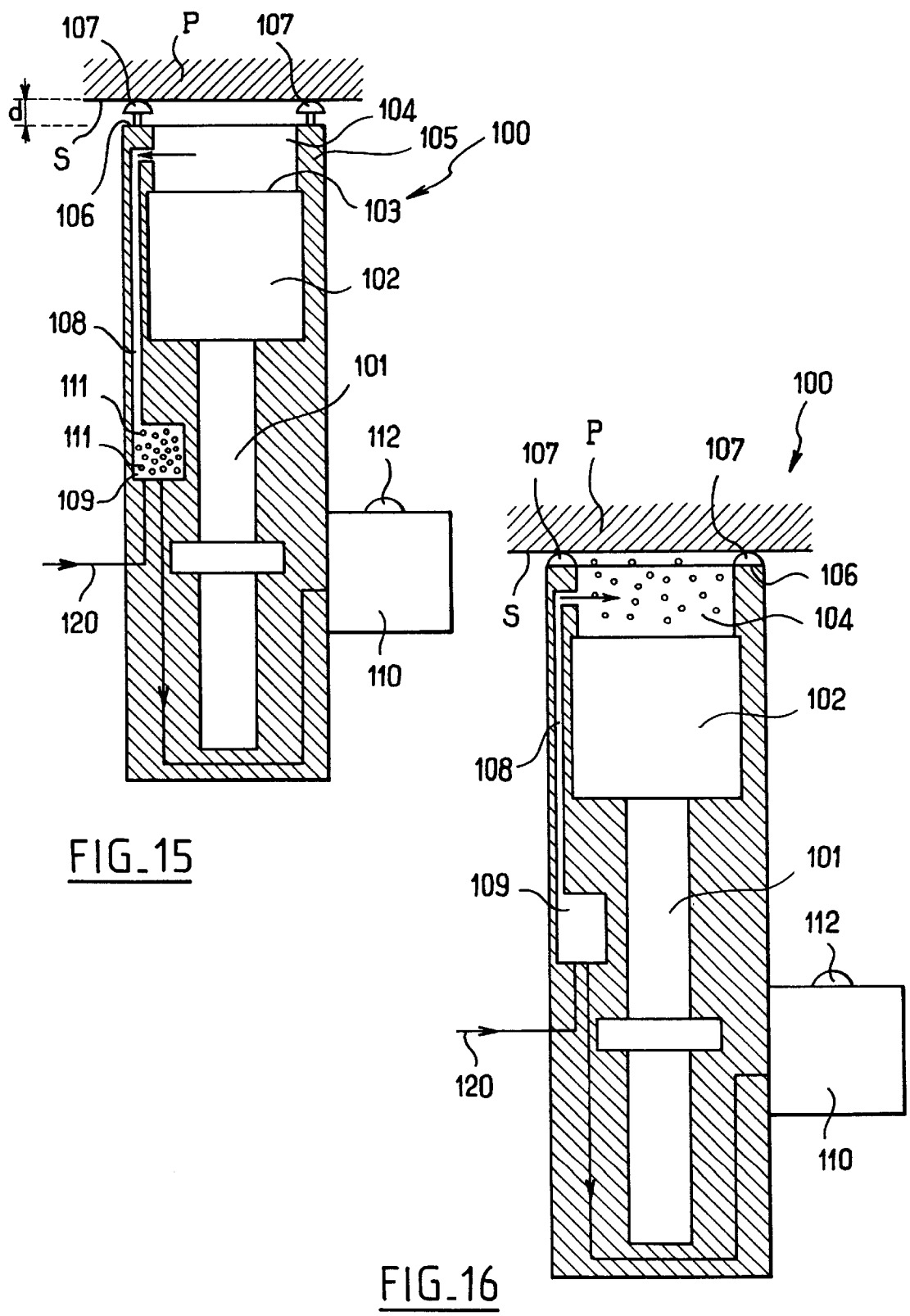

APPARATUS FOR SURFACE TREATMENT BY IMPACT

The present invention relates to the field of apparatus for surface treatment by impact.

BACKGROUND OF THE INVENTION

It is known that a metal part can be treated by steel shot blasting for the purpose of hardening the part, for example.

Shot blasting can be performed under the effect of a jet of compressed air from a shot blaster.

The drawback of such a blaster is that it requires a large supply of shot and it is usable only in a space that is adapted to recovering the shot that has rebounded from the part.

Apparatuses for surface treatment by impact are also known in which the shot is projected by means of a sonotrode placed in the bottom of a metal bowl whose mouth is positioned in register with and at a small distance from the surface to be treated.

Apparatuses of that type present the advantage of the shot returning after rebounding on the part to the sonotrode so as to be projected again against the surface to be treated.

There is thus no loss of shot, providing the clearance between the bowl and the part being treated is small enough to ensure that none escapes.

In order to start the shot moving, it is necessary to bring the shot into contact with the sonotrode, and that presents difficulties when the mouth of the bowl needs to be directed downwards in order to treat the part.

In addition, because of the risk of shot being lost if the clearance between the treated part and the bowl is increased, e.g. when the bowl is moved, such treatment is banned in a regulated environment, such as in the nuclear industry.

Consequently, there exists a need for apparatus to be made available for performing surface treatment by impact and that remedies the above-mentioned drawbacks in particular.

OBJECTS AND SUMMARY OF THE INVENTION

The present invention provides novel apparatus for surface treatment by impact, the apparatus being of the type comprising a vibrating surface and at least one projectile suitable for being projected towards the surface to be treated by said vibrating surface, the apparatus including retaining means for holding each projectile captive in the apparatus when said apparatus is moved away from the surface to be treated.

By means of the invention, it is easy to treat the surface of a part by impact without running the risk of losing shot or without any problem of consuming shot, unlike the previously known apparatuses mentioned above.

The projectiles are advantageously held captive by the apparatus independently of the surface to be treated.

In a particular embodiment, the apparatus includes guide means for guiding each projectile in its forward movement and after rebounding on the vibrating surface.

Thus, when a plurality of projectiles are used, it is possible to guide them in such a manner as to prevent them colliding with one another and to optimize the trajectories of the projectiles between the vibrating surface and the surface to be treated.

In a particular embodiment, the apparatus includes drive means for displacing the guide means relative to the remainder of the apparatus.

Advantageously, the drive means make it possible to make the distribution of the impact points on the surface to be treated uniform and to make the wear of the sonotrode uniform.

In a particular embodiment, each projectile slides in a guide means.

In another particular embodiment, each projectile pivots about an axis between a position in which it comes into abutment against the vibrating surface and a position in which it comes into abutment against the part to be treated.

Still in a particular embodiment, the apparatus includes return means for initiating the motion of each projectile by bringing it into contact with said vibrating surface regardless of the orientation of the apparatus.

In a particular embodiment, the return means comprise at least one chamber into which air can be delivered or from which air can be sucked to urge each projectile towards the vibrating surface.

In a particular embodiment, said retaining means are organized to allow each projectile to strike directly the surface to be treated.

In a variant embodiment, the retaining means are organized to receive the kinetic energy from each projectile and to transfer it locally to the surface to be treated.

By way of example, the mass of each projectile lies in the range 0.1 grams (g) to 5 g.

The invention presents the advantage of making it possible to use a small quantity of projectiles.

Thus, for example, it is possible for the projectiles to use high quality balls of the kind used in ball bearings. Projectiles of this type make it possible to guarantee that the desired material effects are controlled and reproducible.

In a particular embodiment, the apparatus includes a plurality of projectiles each in the form of a pin or slug, together with guide means in the form of a guide piece having a plurality of housings for slidably guiding said pins or slugs.

The term "slug" is used to designate an optionally stepped cylinder with one or both ends being rounded in substantially hemispherical manner without any flat zone.

A ball can be considered as being a slug having generator lines of zero length.

In a particular embodiment, each pin or slug is provided with a shoulder and each housing in the guide piece has a shoulder serving as an end-of-stroke abutment for the associated pin or slug.

In a particular embodiment, the guide piece has a chamber organized to deliver compressed air to the fronts of the shoulders of the pins or slugs and to urge them back towards the vibrating surface.

For example, said chamber is defined at its rear by the body of the guide piece and at its front by a perforated cover fitted to the body of the guide piece.

In a particular embodiment, the guide piece is mounted to rotate about an axis parallel to the sliding direction of the pins or slugs.

Still in a particular embodiment, the pins or slugs are made by inserting rods into sleeves of shorter length than the rods.

In a variant, the pins or slugs consist in single pieces.

In another particular embodiment, the retaining means are constituted by a carpet of beads and the apparatus includes at least one projectile constituted by a ball that is free to rebound successively between the vibrating surface and the carpet of beads.

Preferably, the carpet of beads has beads mounted with clearance on support wires.

In another particular embodiment, the retaining means are constituted by pins or slugs that are movable in a dome-shaped wall, each pin or slug having an end suitable for striking the surface to be treated, the projectiles being constituted by balls that are guided in channels so as to perform back-and-forth motion between the vibrating surface and the other ends of the pins or slugs.

In a particular embodiment, the projectiles are held captive by a guide assembly removably mounted on the apparatus, thereby making it easy to change the projectiles as a function of the surface to be treated.

In a variant embodiment, the apparatus includes an enclosure that is open towards the surface to be treated and the retaining means comprise means serving to generate suction in said enclosure when the enclosure moves away from the surface to be treated by more than a predetermined distance, thereby sucking in the projectiles and preventing them from leaving the apparatus.

Thus, the projectiles do not leave the apparatus.

Advantageously, the apparatus includes a recovery chamber for the projectiles, which chamber is in communication with the enclosure and into which the projectiles are sucked when the enclosure moves away from the surface to be treated by more than a predetermined distance.

Preferably, the apparatus further includes means enabling the balls contained in the recovery chamber to be expelled into the enclosure when the enclosure is close enough to the surface to be treated to ensure that the projectiles are prevented from escaping therefrom.

In a particular embodiment, the edge of the enclosure that comes into register with the surface to be treated is provided with at least one detector suitable for changing state when the distance between the enclosure and the surface to be treated passes through a predetermined value.

Preferably, the edge of the enclosure is provided with a plurality of detectors so as to ensure that the enclosure is sufficiently close to the surface to be treated around its entire periphery at the time the projectiles are sent into the enclosure.

The invention also provides portable apparatus for performing surface treatment by impact, the apparatus including a sonotrode and a plurality of projectiles in the form of pins or slugs slidably mounted (optionally separately) in a guide piece, the guide piece being secured to handle means enabling the user to position it manually to face the part to be treated, the guide piece being organized and positioned relative to the sonotrode so as to enable the pins or slugs to perform back-and forth motion between the sonotrode and the part to be treated by rebounding successively thereon, and secondly to retain the pins or slugs in the absence of a part to be treated.

Such apparatus makes it easy to treat a part in situ, without any fear of losing shot, which is most advantageous compared with known apparatuses.

The invention also provides a set of projectiles for apparatus as defined above.

The invention also provides the use of apparatus as defined above for modifying in situ the shape of a part in order to enable it to be integrated in an assembly.

The invention also provides the use of apparatus as defined above for performing surface treatment in situ and for creating a specific surface state. By way of example, the treatment can consist in treating a cracked part that has been repaired by adding material or in rectifying boiler plate very quickly, or indeed in shaping such a part.

The invention applies to treating all types of part subjected to mechanical stress such as engine parts, structural parts, connection parts, or welded assemblies.

BRIEF DESCRIPTION OF THE DRAWINGS

The invention will be better understood on reading the following detailed description of non-limiting embodiments, and on examining the accompanying drawings, in which:

FIG. 1 is a diagrammatic axial section view of apparatus constituting a first embodiment of the invention;

FIG. 2 is a fragmentary and diagrammatic axial section view of apparatus constituting a second embodiment of the invention;

FIG. 3 is a fragmentary and diagrammatic axial section view of apparatus constituting a third embodiment of the invention;

FIG. 4 is a fragmentary and diagrammatic axial section view of apparatus constituting a fourth embodiment of the invention;

FIG. 5 is a plan view seen along arrow V of FIG. 4;

FIG. 6 is a fragmentary and diagrammatic axial section view of apparatus constituting a fifth embodiment of the invention;

FIG. 7 shows a detail of FIG. 6;

FIG. 8 shows a projectile of the apparatus of FIG. 1 in isolation;

FIG. 9 shows a detail of the carpet of beads of FIG. 2;

FIG. 12 is an axial section of a pin or slug made by machining a single piece;

FIG. 13 shows a variant embodiment using pins or slugs of the kind shown in FIG. 12;

FIG. 14 shows a projectile in a variant embodiment; and

FIGS. 15 and 16 show a seventh embodiment of the invention.

MORE DETAILED DESCRIPTION

Figure 10:
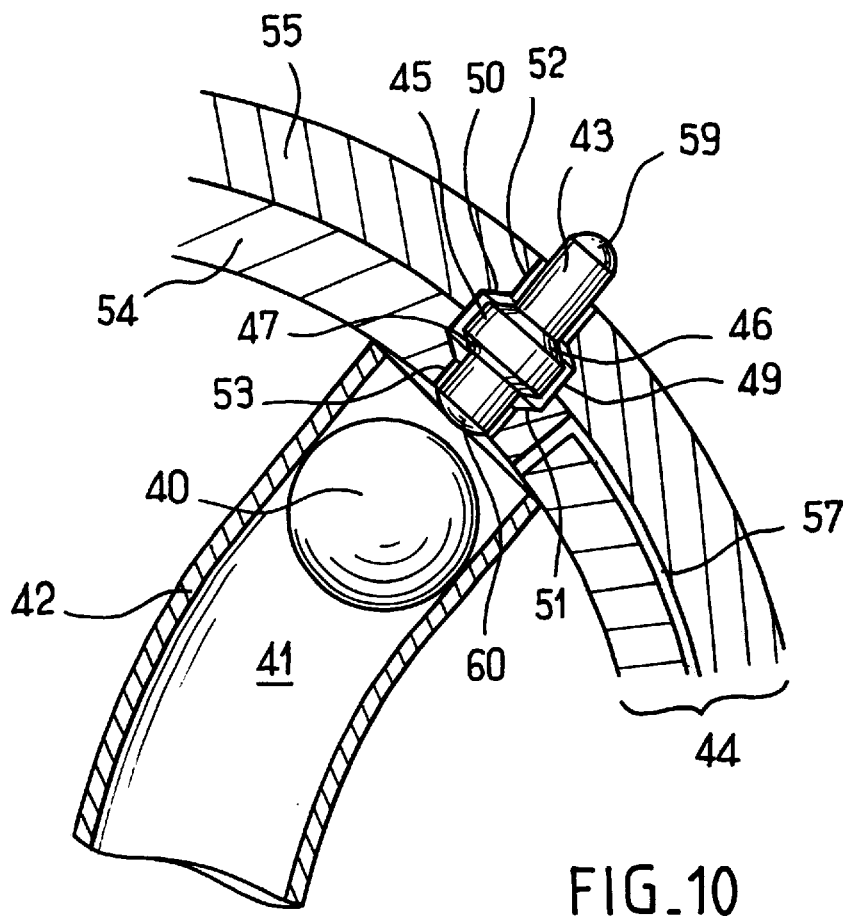
FIGS. 10 and 11 show a sixth embodiment of the invention.

The treatment apparatuses described below are for treating the surface S of a part P, e.g. for any one of the following purposes:

increasing the surface hardness of the part;

creating residual surface stresses for increasing the lifetime of the part;

deforming or shaping the part;

creating a particular surface state;

increasing the surface density of the part, particularly for a part that is porous; and/or increasing its resistance to corrosion.

The apparatus 1 shown in FIG. 1 comprises. an acoustic assembly 2 having a longitudinal axis X.

The acoustic assembly 2 has a metal sonotrode 3 secured to a piezoelectric emitter 5 via one or more acoustic amplifier elements 4 presenting, in conventional manner, a profile adapted to amplifying the amplitude of oscillation along the axis X.

The acoustic assembly 2 is secured, via one or more fixing zones constituting vibration nodes, to a structure 8 surrounding the sides of the sonotrode 3 and projecting in front of it for fixing a guide piece 9 which serves to guide a plurality of projectiles 11, as described in greater detail below.

The piezoelectric emitter 5 is electrically connected to a conventional electricity generator 6 which generates AC at a frequency lying in the range 5 kHz to 20 kHz, and which is about 10 kHz in the example described.

The acoustic assembly 2 is designed in this case to have a resonant frequency of about 20 kHz in its mode of vibration along the axis X.

The frequency of the electricity delivered by the generator 6 is adjustable so as to enable it to be made exactly equal to the resonant frequency of the acoustic assembly 2 and thus optimize the amplitude of vibration of the free end face of the sonotrode 3. The power delivered by the generator serves to increase or decrease the amplitude of vibration of the free end face of the sonotrode 3.

The end of the sonotrode 3 constitutes a vibrating surface 7 which serves to project the projectiles 11 towards the surface to be treated.

In the example described, the projectiles 11 are slidably mounted in respective housings 10 passing through the guide piece 9 so that each of them slides in a direction parallel to the axis X.

Each housing 10 is circularly symmetrical and presents a shoulder 12.

The housings 10 may be randomly positioned over the guide piece 9.

FIG. 8 shows a projectile 11 in isolation.

As can be seen in this figure, the projectile 11 in this example is in the form of a pin or slug made by forcing a metal rod lib into a circularly cylindrical metal sleeve 11a, the pin 11b being longer than the sleeve 11a so that the front end 11c of the pin 11b can project outside the guide piece 9 when the shoulder lle defined by the front end of the sleeve 11a comes into abutment against the shoulder 12 of the associated housing 10.

The rod 11b can advantageously be made using a roller originally manufactured for use in making a roller bearing.

For given energy transferred to the surface, the shape and the mass of the projectile are selected as a function of the shape of the part to be treated.

The shape of the front end 11c of the rod 11b is selected as a function of the dent that is to be left in the part P after impact.

When the front end 11c is spherical as in the embodiment described, its radius of curvature is selected as a function of the depth of the part P that it is desired to affect during impact.

By way of example, the rear face 11d of the projectile 11 can be given a surface that is spherical or plane, with its radius of curvature being greater than 0.5 mm, for example.

The front and rear ends 11c and 11d of the projectile can receive surface treatment in order to harden them and to improve rebound on the part to be treated and on the sonotrode 3.

In the embodiment described, each projectile is made by assembling together two elements, however it would not go beyond the ambit of the present invention to make each projectile 11 in the form of a single piece.

By way of example, FIG. 12 shows a single-piece projectile 11' made by machining.

The projectile 11' has a cylindrical body 11'a having two shoulders 11'e and 11'f at opposite ends, and cylindrical portions 11'b and 11'g of smaller diameter than the body 11'a extending beyond said shoulders.

The axial ends 11'c and lid of the projectile 11' are rounded in all directions, and in the example described are substantially hemispherical in shape.

In a variant (not shown), the shoulders 12 can be conical and the shapes of the pins adapted accordingly.

The guide piece 9 is positioned relative to the vibrating surface 7 in such a manner that none of the projectiles 11 can escape from its housing 10 when its rear end 11d comes into contact with the sonotrode 3.

The apparatus 1 operates as follows.

After the rear end 11d of each projectile 11 has been brought into contact with the vibrating surface 7, the vibrations of the sonotrode 3 project the projectiles 11 towards the part P to be treated, with the surface S thereof being positioned at a short distance from or in contact with the guide piece 9.

The front ends 11c of the projectiles 11 strike the surface S, and on impact their kinetic energy is transformed by friction into heat, and is also transformed into plastic and elastic deformation energy.

The projectiles 11 rebound on the part P and back-and-forth motion of the projectiles is established between the sonotrode 3 and the part P while the surface S is being treated.

The apparatus 1 as described above presents numerous advantages over known apparatuses that use shot, and in particular:

- there is no loss of energy due to the projectiles colliding with one another, thereby providing treatment that is more efficient;
- there is no risk of the projectiles being lost;
- the path followed by the projectiles between the sonotrode and the part to be treated is rectilinear, thereby reducing the dead time between two successive impacts of the same projectile on the surface to be treated and thus optimizing the intensity and the duration of treatment; and
- the mass of the projectile can be selected to be greater or smaller, e.g. by acting on the length of the sleeve 11a or on the length of the rod 11b, without altering the shape of the surface that impacts on the part to be treated.

FIG. 2 shows a second embodiment of apparatus in accordance with the invention.

This apparatus differs from the preceding apparatus by the fact that the structure 8 is used in this case to fix a ring 15 whose opening is closed by a carpet of beads 17 serving to retain projectiles 18.

In this case, the projectiles 18 are constituted by balls that are free to move in the space 14 that is defined axially by the carpet of beads 17 and the sonotrode 3, and laterally by the structure 8.

The projectiles 18 are set into motion by the sonotrode 3 vibrating, and they perform multiple rebounds between the vibrating surface 7 and the carpet of beads 17.

The carpet of beads 17 locally transfers the kinetic energy from the projectiles 18 to the surface S of the part P to be treated.

FIG. 9 shows two beads 17a of the carpet of beads 17.

The beads 17a are held by any appropriate fixing means e.g. by means of support wires 17b on which they are mounted with clearance, as shown.

The example of FIG. 3 differs from that of FIG. 2 by the fact that the ring 15 is secured to the structure 8 via a curved endpiece 20.

This curved endpiece 20 is used when there is not room for the treatment apparatus to be positioned so that its longitudinal axis X extends substantially perpendicularly to the plane of the surface S to be treated.

FIG. 4 shows a variant embodiment in which the structure surrounding the sonotrode 3, now referenced 21, is organized to support a shaft 24 on which a plurality of projectile-forming masses 22 are hinged about an axis of rotation Y extending perpendicularly to the plane of FIG. 4.

Each mass 22 in this example is constituted by a body that is generally in the form of a rectangular block, hinged on the shaft 24 in the vicinity of a bottom-left corner and capable of bearing via a bottom-right corner on the vibrating surface 7, as can be seen in FIG. 4.

Each mass 2 also has a top-right corner with a projection 23 having an end suitable for striking the surface S of the part P to be treated.

In operation, each mass 22 performs back-and-forth motion between the surface S of the part P and the sonotrode 3.

By mounting the masses 22 pivotally it is possible to treat the part P while the longitudinal axis X of the apparatus extends substantially parallel to the surface S to be treated, and this can be advantageous for reasons of space.

FIG. 14 shows a variant embodiment in which the masses 22 are replaced by masses 22' each comprising two limbs 70 and 71 that are at an angle i to each other, which angle can be arbitrary, e.g. being equal to 90° as in the example shown.

The limbs have projections 73 and 74 respectively organized to strike the sonotrode 3 and the surface-to be treated S.

FIGS. 6 and 7 show a variant embodiment in which the projectiles 11 are in the form of pins identical to those of the apparatus described above with reference to FIG. 1, said projectiles 11 being guided to slide parallel to the axis X in housings 25 of a guide piece 26, which housings 25 can advantageously be positioned randomly over the guide piece 26, as in the example described above. Unlike the apparatus of FIG. 1, the guide piece 26 in this case is mounted to rotate about the axis X, and it is driven about said axis by a gear system 36 coupled to an electric motor 28 received in the thickness of the wall of the structure surrounding the sonotrode 3 and referenced 29.

Each of the housings 25 is provided with a shoulder 35 for retaining the associated projectile 11.

The front end of the body of the guide piece 26 has a setback 27 which is stepped at its periphery 34 so as to enable a cover 39 to be installed, which cover is provided with bores 30 for passing the rods 11b of the projectiles.

The cover 39 co-operates with the bottom of the setback 27 to form a chamber 31 into which compressed air can be blown from a pipe 32 connected to a compressor 33 and shown highly diagrammatically in FIG. 7.

This delivery of compressed air into the chamber 31 serves to urge the projectiles 11 backwards so as to bring them into contact with the vibrating surface 7, which can then impart the initial impulse thereto for projecting them towards the surface to be treated.

This makes it possible to set the projectiles into motion regardless of the orientation of the apparatus, and particularly when the guide piece 26 faces downwards.

The compressed air also serves to cool the body of the guide piece 26, the cover 39, the sonotrode 3, and the projectiles 11 while the apparatus is in operation.

In a variant that is not shown, suction is used for sucking the projectiles towards the sonotrode, instead of using pressure as described above.

The suction is established between the guide piece 26 and the sonotrode 3.

By using the motor 28 to rotate the guide piece 26 while the apparatus is in operation, and by having the housings 25 randomly positioned, the projectiles are prevented from striking the same location on the sonotrode 3 twice in succession, or from striking the same location on the surface S of the part P to be treated twice in succession whenever the structure 29 is held stationary, thereby making it possible to ensure that the impacts are distributed uniformly over the surface S. This also makes it possible to ensure that wear on the sonotrode 3 is made uniform.

Reference 37 designates an extension of the structure 29 constituting handle means that are not shown in full, and enabling a user to perform and control operation of the treatment by hand.

Figure 11:
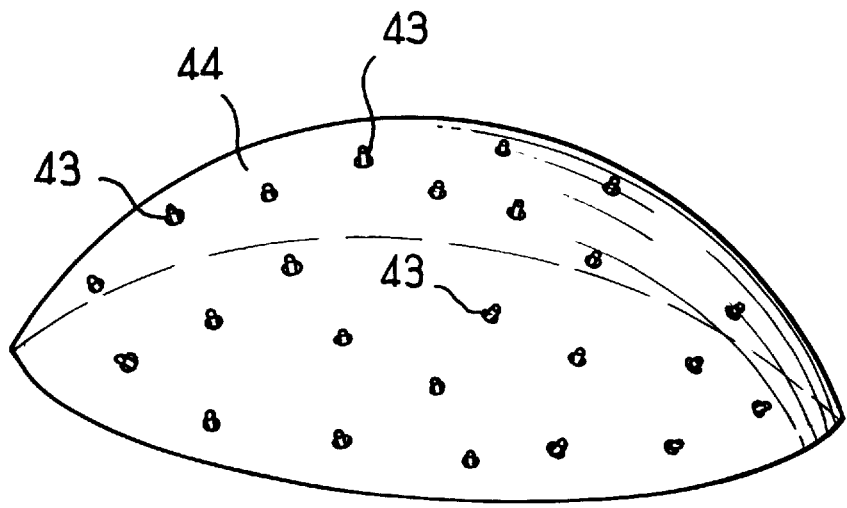

FIGS. 10 and 11 show a sixth embodiment of the invention.

In this embodiment, the projectiles are constituted by balls 40 guided in individual channels 41 formed by tubes 42.

Each ball 40 performs back-and-forth motion in the corresponding tube 42 between the vibrating surface disposed at one end of the tube and the other end which has a pin 43 mounted to move in a guide piece 44 that is dome-shaped, as shown very diagrammatically in FIG. 11.

The axes of the pins 43 extend radially relative to the wall 44.

Each pin 43 comprises a cylindrical body provided with an annular swelling 45 that is about halfway along it, the swelling having axial faces forming frustoconical shoulders 46 and 47.

Each swelling 45 is received in a chamber 49 in the wall 44, which chamber is defined axially by two conical shoulders 50 and 51 against which the shoulders 46 and 47 of the pin 43 can come respectively into abutment.

In a variant (not shown), the shoulders 50 and 51 can be straight, with the shape of the pins 43 being adapted accordingly.

The distance between the shoulders 50 and 51 allows each pin 43 to move a certain distance in an axial direction.

Each chamber 49 opens out both to the outside of the wall 44 via a hole 52 and to the tube 42 via a hole 53, the holes 52 and 53 being slightly greater in diameter than the cylindrical portions of the pins 43 situated on either side of the swelling 45.

In the embodiment described, the wall 44 is made by assembling an inner wall 54 and an outer wall 55 one against the other, said walls being united after the pins 43 have been put into place.

The face of the inner wall 54 that comes into contact with the outer wall has recesses formed therein to define channels 57 serving to convey compressed air to the ends of the tubes 42 that lead to the pins 43 so as to urge the balls 40 towards the sonotrode and thus initiate successive rebounds.

This embodiment presents the advantage of making it possible to treat a surface of complex shape, e.g. having curved connection fillets.

In use, each ball 40 performs successive rebounds between the sonotrode and the inner end 60 of the corresponding pin 43, transferring its kinetic energy thereto.

The surface to be treated is struck by the outer end 59 of the pin 43.

FIG. 13 shows a variant embodiment of the FIG. 7 apparatus and serves to illustrate the possibility of holding the projectiles captive in a removable guide assembly that is intended to facilitate projectile replacement.

It is thus possible to make a set of guide assemblies, each guide assembly being provided with a given type of projectile.

A particular guide assembly is then selected from the set as a function of the treatment that is to be performed.

The guide assemblies can be fitted to a turntable enabling the projectiles used to be changed quickly as a function of the surface being treated.

In the example of FIG. 13, the guide assembly houses projectiles 11' and has a retaining piece 60 fixed to the guide piece 26 of the embodiment of FIG. 7.

The retaining piece 60 has holes 61 with shoulders 62.

The holes 61 are of a depth which is selected so that the bottom ends 11'd of the projectiles 11' can reach the sonotrode 3 prior to the shoulders 11'f coming into abutment against the shoulders 62.

In all of the embodiments described, when there is no part to be treated, the projectiles continue to be held captive by the apparatus.

Naturally, the invention is not limited to the embodiments described above, and features thereof can be combined in multiple ways.

In particular, the guide piece need not be rotated as described in FIGS. 6 and 7, but can be moved in translation in one or two directions in a plane, with the displacement being random in each direction.

The carpet of beads 17 in the embodiment of FIGS. 2 and 3 can be replaced by any other deformable wall capable of locally transferring kinetic energy from the projectiles to the part to be treated, and capable of cooling the body of the guide piece 44, the tube 42, the projectiles 40, and the associated sonotrode while the apparatus is in operation.

It is also possible, without going beyond the ambit of the present invention, to replace the use of compressed air for bringing the projectiles into contact with the vibrating surface by other return means, e.g. springs or magnets.

FIGS. 15 and 16 show apparatus 100 constituting another embodiment of the invention.

This apparatus 100 has an acoustic assembly 101 coupled to a sonotrode 102 that presents a vibrating surface 103 suitable for projecting the projectiles towards the surface S to be treated.

The sonotrode 102 is placed in the bottom of an enclosure 104 whose sides are defined by a wall 105 whose front edge 106 is placed in use to face the surface S.

The wall 105 is provided with electrical contactors 107 distributed around the periphery of its front edge 106, each of the contactors being capable of changing state when the distance d between the front edge 106 and the surface S becomes less than some predetermined value.

The enclosure 104 communicates via a duct 108 with a recovery chamber 109, itself connected to means 110 serving almost instantaneously to generate a high degree of suction in the recovery chamber 109.

The recovery chamber 109 also communicates via a duct 120 with a source of compressed air (not shown).

The recovery chamber 109 is suitable for holding a set of projectiles 111 which in this example are constituted by balls.

The apparatus 100 includes an electrical contactor 112 capable of being actuated by the user to set the acoustic assembly 101 into operation.

The apparatus 100 operates as follows.

It is assumed that the projectiles 111 are present in the recovery chamber 109.

The user brings the opening of the enclosure 104 into register with the surface to be treated, and moves the front edge 106 towards it.

The user presses on the contactor 112 to excite the sonotrode.

By means of its contactors 107, the apparatus determines whether the front edge 106 is close enough to the surface to be treated to ensure that none of the balls will escape during treatment.

If the front edge 106 is close enough, then a jet of compressed air is delivered to the recovery chamber 109 to expel the balls therefrom and convey them into the enclosure 104 where they are subjected to the vibration of the sonotrode 102 and perform multiple trips between the surface to be treated and the sonotrode.

If the user moves the apparatus away from the surface to be treated, then the contactors 107 change state and interrupt operation of the acoustic assembly while simultaneously causing suction to be established in the recovery chamber 109, thereby enabling the balls 111 to be recovered and preventing them from leaving the apparatus.

Creating suction for returning the balls into the recovery chamber constitutes recovery means within the meaning of the present invention, and avoids projectiles being lost.

The suction can be obtained in various ways, for example by means of a vacuum pump or by using compressed air in association with a venturi effect device.

What is claimed is:

1. Apparatus for surface treatment by impact, the apparatus comprising a body having an axis and a vibrating surface inside the body, and at least one projectile suitable for being projected along the axis by the vibrating surface towards a surface to be treated, the apparatus including retaining means for holding each projectile captive in the apparatus, the retaining means being in a fixed position relative to the axis of the body.

2. Apparatus according to claim 1, including guide means for guiding each projectile in a movement towards and away from the vibrating surface.

3. Apparatus according to claim 2, including drive means for displacing the guide means relative to the body.

4. Apparatus according to claim 2, wherein each projectile is mounted in a sliding fashion in the guide means.

5. Apparatus according to claim 4, including a plurality of projectiles each in the form of a pin, and wherein said guide means comprise a guide piece having a plurality of housings for slidably guiding each of said pins.

6. Apparatus according to claim 5, wherein each pin is provided with a shoulder.

7. Apparatus according to claim 1, including return means for imparting each projectile with a motion towards said vibrating surface.

8. Apparatus according to claim 1, wherein said retaining means are organized to allow each projectile to strike directly the surface to be treated.

9. Apparatus according to claim 1, wherein the retaining means are organized to receive the kinetic energy from each projectile and to transfer it locally to the surface to be treated.

10. Apparatus according to claim 1, wherein the mass of each projectile lies in the range 0.1 g to 5 g.

11. Apparatus according to claim 1, wherein at least one projectile is held captive by a guide assembly removably mounted on the apparatus.

12. The apparatus according to claim 1, wherein said vibrating surface is a surface of a sonotrode.

13. Apparatus for surface treatment by impact, said apparatus comprising a vibrating surface, and at least one projectile suitable for being projected by said vibrating surface towards a surface to be treated, wherein each projectile pivots about an axis between a position in which it comes into abutment against the vibrating surface and a position in which it comes into abutment against the surface to be treated.

14. The apparatus according to claim 13, wherein the mass of each projectile lies in the range 0.1 g to 5 g.

15. The apparatus according to claim 13, wherein said vibrating surface is a surface of a sonotrode.

16. Apparatus for surface treatment by impact, said apparatus comprising a vibrating surface and at least one projectile captive in the apparatus and suitable for being projected by said vibrating surface towards a surface to be treated, said apparatus comprising at least one chamber into which air can be delivered to urge each projectile towards the vibrating surface.

17. The apparatus according to claim 16, wherein the mass of each projectile lies in the range 0.1 g to 5 g.

18. The apparatus according to claim 16, wherein said vibrating surface is a surface of a sonotrode.

19. Apparatus for surface treatment by impact, said apparatus comprising a vibrating surface and at least one projectile captive in the apparatus and suitable for being projected by said vibrating surface towards a surface to the treated, said apparatus comprising at least one chamber from which air can be sucked to urge each projectile towards the vibrating surface.

20. The apparatus according to claim 19, wherein the mass of each projectile lies in the range 0.1 g to 5 g.

21. The apparatus according to claim 19, wherein said vibrating surface is a surface of a sonotrode.

22. Apparatus for surface treatment by impact, the apparatus comprising a vibrating surface and at least one projectile suitable for being projected by said vibrating surface towards a surface to be treated, said apparatus including a carpet of beads and at least one projectile being constituted by a ball that is free to rebound between the vibrating surface and the carpet of beads.

23. Apparatus according to claim 22, wherein the carpet of beads has beads mounted with clearance on support wires.

24. The apparatus according to claim 22, wherein the mass of each projectile lies in the range 0.1 g to 5 g.

25. The apparatus according to claim 22, wherein said vibrating surface is a surface of a sonotrode.

26. Apparatus for surface treatment by impact, the apparatus comprising a vibrating surface and including pins that are movable in a dome-shaped wall, said pins each having one end suitable for striking a surface to be treated and an opposite end, the apparatus including projectiles guided in channels to perform back-and-fourth motion between the vibrating surface and said opposite ends of the pins.

27. The apparatus according to claim 26, wherein the mass of each projectile lies in the range 0.1 g to 5 g.

28. The apparatus according to claim 26, wherein said vibrating surface is a surface of a sonotrode.

29. Apparatus for surface treatment by impact, said apparatus comprising a vibrating surface and a plurality of pins suitable for being projected by said vibrating surface towards a surface to be treated, said apparatus comprising a plurality of housings for slidably guiding each of said pins towards and away from said vibrating surface, wherein each pin is provided with a shoulder, and wherein the housings have shoulders serving as end-of-stroke abutments for the pins.

30. The apparatus according to claim 29, wherein the mass of each projectile lies in the range 0.1 g to 5 g.

31. The apparatus according to claim 29, wherein said vibrating surface is a surface of a sonotrode.

32. Apparatus for surface treatment by impact, said apparatus comprising a vibrating surface and pins suitable for being projected by said vibrating surface towards a surface to be treated, the apparatus comprising a guide piece having a plurality of housings for guiding each of said pins, wherein each pin is provided with a shoulder having a front face, wherein the guide piece has a chamber organized to deliver compressed air to the front faces of the shoulder of each pin and to urge the pin back towards the vibrating surface.

33. Apparatus according to claim 32, wherein said chamber has a rear part defined by a body of the guide piece and a front part defined by a perforated cover fitted to the body of the guide piece.

34. The apparatus according to claim 32, wherein the mass of each projectile lies in the range 0.1 g to 5 g.

35. The apparatus according to claim 32, wherein said vibrating surface is a surface of a sonotrode.

36. Apparatus for surface treatment by impact, said apparatus comprising a vibrating surface and pins captive in said apparatus, said pins being suitable for being projected towards a surface to be treated by said vibrating surface, said apparatus comprising a guide piece having a plurality of housings for guiding each of said pins, wherein the guide piece is mounted to rotate about an axis parallel to a sliding direction of the pins.

37. The apparatus according to claim 36, wherein the mass of each projectile lies in the range 0.1 g to 5 g.

38. The apparatus according to claim 36, wherein said vibrating surface is a surface of a sonotrode.

39. Apparatus for surface treatment by impact, said apparatus comprising a vibrating surface and at least one projectile suitable for being projected by said vibrating surface towards a surface to be treated, the apparatus including an enclosure that is open towards the surface to be treated and means serving to generate suction in said enclosure when the enclosure moves away from the surface to be treated by more than a predetermined distance, thereby sucking in the projectiles and preventing them from leaving the apparatus.

40. Apparatus according to claim 39, including a recovery chamber for the projectiles, which chamber is in communication with the enclosure and into which the projectiles are sucked when the enclosure moves away from the surface to be treated by more than a predetermined distance.

41. Apparatus according to claim 40, including means enabling the balls contained in the recovery chamber to be expelled into the enclosure when the enclosure is close enough to the surface to be treated to ensure that the projectiles are prevented from escaping therefrom.

42. Apparatus according to claim 39, wherein an edge of the enclosure that comes into register with the surface to be treated is provided with at least one detector suitable for changing state when the distance between the enclosure and the surface to be treated passes through a predetermined value.

43. Apparatus according to claim 25, wherein an edge of the enclosure is provided with a plurality of detectors so as to ensure that the enclosure is sufficiently close to the surface to be treated around its entire periphery at the time the projectiles are sent into the enclosure.

44. The apparatus according to claim 39, wherein the mass of each projectile lies in the range 0.1 g to 5 g.

45. The apparatus according to claim 39, wherein said vibrating surface is a surface of a sonotrode.

46. Apparatus according to claim 39, wherein said apparatus is provided with at least one detector suitable for changing state when the distance between said enclosure and the surface to be treated passes through a predetermined value.

47. Apparatus according to claim 46, wherein the apparatus is provided with a plurality of detectors so as to ensure that said enclosure is sufficiently close to the surface to be treated around its entire periphery at the time the projectiles are sent into the enclosure.

48. Apparatus according to claim 39, wherein each projectile is a ball.

49. Apparatus for surface treatment by impact, said apparatus comprising a vibrating surface and pins captive in said apparatus, said pins being suitable for being projected towards a surface to be treated by said vibrating surface, said apparatus comprising a guide piece having a plurality of housings for guiding each of said pins, wherein the guide piece is mounted to rotate about an axis.

50. The apparatus according to claim 49, wherein the mass of each projectile lies in the range 0.1 g to 5 g.

51. The apparatus according to claim 49, wherein said vibrating surface is a surface of a sonotrode.

* * * * *